United States Patent
Pluta

[15] 3,658,405
[45] Apr. 25, 1972

[54] VARIABLE PHASE-CONTRAST AND INTERFERENCE MICROSCOPE

[72] Inventor: Maksymilian Pluta, Centralne Laboratorium Optyki, ul. Kamionkowska 18, Warszawa 4, Poland

[22] Filed: May 22, 1970

[21] Appl. No.: 39,716

[30] Foreign Application Priority Data

May 26, 1969 Poland..................P-133821

[52] U.S. Cl..................350/12, 350/13, 350/14, 350/157, 356/106
[51] Int. Cl........................................G02b 27/28
[58] Field of Search..................350/12–15, 157; 356/106

[56] References Cited

UNITED STATES PATENTS

| | | | |
|---|---|---|---|
| 2,601,175 | 6/1952 | Smith | 350/12 |
| 3,454,340 | 7/1969 | Nomarski | 350/13 |
| 2,688,899 | 9/1954 | Rantsch | 350/12 |
| 2,655,077 | 10/1953 | Bennett | 350/13 |

FOREIGN PATENTS OR APPLICATIONS

| | | | |
|---|---|---|---|
| 1,517,701 | 2/1969 | France | 350/12 |
| 160,864 | 5/1964 | U.S.S.R. | 350/12 |

OTHER PUBLICATIONS

Beyer et al., " Interference Equipment for Transmitted-Light Microscopy" Jena Review (6/22/65) pp. 99– 105

*Primary Examiner*—David Schonberg
*Assistant Examiner*—Paul R. Miller
*Attorney*—Irvin A. Lavine

[57] ABSTRACT

An interference system for qualitative and quantitative investigation of micro-objects in transmitted light by means of the variable phase-contrast and variable shear interference methods. The system is located between an microscope objective and eyepiece. It resembles the Michelson interferometer in which a standard light beam splitter is replaced by an interference polarizer (Banning type), giving two orthogonally polarized beams, and two quarter-wave plates inserted in the split beams, and a common linear polarizer placed in the recombined beams. The interferometer mirrors are located in the planes conjugated with an aperture diaphragm of a microscope condenser. For interference investigation a slit condenser diaphragm is used. The optical path difference between the object under investigation and the surrounding medium is measured by the Senarmont method. Image shear is varied by tilting one of the interferometer mirrors. For phase contrast observation a ring-shaped condenser aperture is used together with an annular stop located close to one interferometer mirror and annular opening located close to the other mirror. The annular stop absorbs the direct (undiffracted) light and the annular opening absorbs the diffracted light, thus the first said mirror reflects the diffracted light and the second mirror reflects the direct light. Both light beams are recombined by the interference polarizer and brought to the vibrations in the same polarisation plane by a common linear polarizer. These light beams interfering with each other produce interference images of objects under investigation. The image contrast and contrast sign is changed with the Senarmont compensator.

11 Claims, 4 Drawing Figures

VARIABLE PHASE-CONTRAST AND INTERFERENCE MICROSCOPE

BACKGROUND OF THE INVENTION

This invention relates to phase-contrast and interference microscopy and has particular reference to qualitative and quantitative investigation of phase specimens in transmitted light when variable phase contrast and variable shear interference methods are needed.

In common microscopical phase-contrast systems the image of an aperture diaphragm, located in or near the front focal plane of a condenser, is formed on a phase-retarding or phase-advancing plate placed in or near the back focal plane of the microscope objective. The light beam issuing from the transparent area of the condenser diaphragm is partially diffracted by the object under investigation. The diffracted light does not pass through the phase plate but through the remaining area of the pupil of the microscope objective. The pupil area defined by the image of the clear portion of the condenser diaphragm is termed the "conjugate area," and remaining portion of this pupil is termed the "complementary area." The conjugate area is covered by the phase plate which changes the phase of the direct light (undiffracted light) with respect to the diffracted beam by +90° (positive phase plate) or −90° (negative phase plate). Such a phase change permits the obtaining of contrasting images of normally invisible phase specimens (i.e. shifting the phase of the light only, without any modulation of its amplitude) in the field of view of the microscope. The phase-contrast image is produced by interference between the direct and diffracted light beams. Since the latter is, as a rule, weak, there is a great difference in amplitude between the two interfering beams and for their constructive interference the intensity of the direct light is reduced by adding an absorbing thin film to the phase-plate.

The phase-plate is, generally, in the form of a ring. Correspondingly, the condenser diaphragm conjugated with the phase-ring consists of a transparent annulus or annular opening. The image of this opening produced by the condenser and objective system must be in coincidence with the phase ring.

Most phase-contrast microscopes presently available employ objectives with phase ring of +90° or −90° phase shift and predetermined light absorption (usually 75 – 90 %). Such a phase-ring is, however, suitable for observation phase specimens producing very slight light phase shifts. For highly refractive phase objects and light absorbing ones, phase rings with another value of light phase shift and light absorption are more suitable. Microscopical specimens, particularly biological ones, vary considerably, and a single phase plate with a fixed phase shift and constant light absorption is not adequate to yield all possible information about different specimens. In order to obtain the best image contrast and good visibility for a variety of objects investigated by means of the phase-contrast method, a phase plate with variable phase shift and variable light absorption is needed. It is thus necessary to design phase-contrast devices with continuous change of the phase and/or amplitude of undiffracted relative to diffracted light. Many such devices are described in the literature see for example Smith U.S. Pat. No. 2,601,175, Osterberg et al. U.S. Pat. No. 2,700,918, Nomarski U.S. Pat. No. 2,924,142 and Osterberg U.S. Pat. No. 3,180,216. See also Journal of the Optical Society of America, vol. 37, Sept. 1947, pages 726–730, H. Osterberg article "The Polanret Microscope; Journal of the Optical Society of America, vol. 50, Feb. 1960, pages 163–165. J. R. Meyer-Arendt article "Novel System for Obtaining Variable Phase Contrast;" Progress in Microscopy of M. Francon, Pergamon Press, Oxford-London-New York-Paris, 1961, pages 76–90 and 97–122. These prior proposals have found little practical application, as their manufacture is difficult or expensive. From among these devices the "polanret" system developed by H. Osterberg is the most versatile. However, this system has, in the back focal plane of the microscope objective, a phase plate consisting of zonal polarizing filters which are very dificult to manufacture commercially. In this system the phase difference between the direct and diffracted beams is varied by rotation of a polarizer placed before the polarizing zonal plate and the intensity ratio of these beams is changed by rotation of an analyzer located behind this zonal plate.

Phase-contrast microscopy provides high sensitivity to minute changes in the optical path (less than 0.2 wavelength) and yields the light distribution in the image conformable to the optical thickness variations in object when the latter is small. The phase-contrast method is, in fact, based on phase modulation of the direct light without altering the light diffracted by the object. For this both kinds of light should be distinctly separated from each other. This is not achieved unless the object observed is small. Otherwise, the diffracted and direct light are coalesced to such an extent that their segregation is not readily possible. Besides, the phase plate shades the objective pupil, giving rise to an injurious diffraction halo round the images of objects observed. These defects are not present in interference microscopy which makes it possible to observe all the phase specimens and does not discriminate between large and small objects. They can be seen regardless of their shape and dimensions. Furthermore, an interference microscope, like any interferometer, permits measurement of the optical path difference between the object and its surrounding medium.

There are many interference microscopes presently available and described in the literature. Most of them belong to the shearing type of interference system which include birefringent beam splitters and recombiners inserted between two polarizers. These microscopes are termed polarizing or double refracting interference microscopes. They can be classified into three basic groups. To the first group belong systems employing two birefringent plane parallel plates ( e.g. the Lebedeff, Francon, Johansson or Smith system ) , to the second group belong systems with birefringent Wollaston prisms (Nomarski, Smith, Pluta) , and to the third group belong systems with birefringent lenses (Philpot).

Interference of light in polarizing interference microscopes occurs between two light waves: ordinary and extraordinary, sheared or split by the birefringent system. Each of these waves "carries" the phase image of the object investigated and upon interference one with the other, give in the image plane of the microscope two duplicated or separated images: an ordinary and an extraordinary one (the latter is very astigmatic and defocused in some systems) .

The amount of image duplication or separation is one of the basic characteristics of the polarizing interference microscope. This duplication determines the range of practical application of such a microscope, especially for biological investigations and for determining the dry mass of cells, tissues and fragments thereof. For a microscope objective of a given magnification and for a given birefringent system, the value of image duplication, in hitherto known polarizing interference microscopes, is constant or imparted by different shears.

In practice there are specimens which contain small and extended objects. The measurement of their optical path differences with a shearing interference microscope requires different image duplications. In general, a shearing interference microscope which produces large image splitting has wider measuring possibilities than one producing small image shears. But in the former more rigorous conditions for an effective light interference must be fulfilled. Furthermore, the interference contrast of images formed by largely sheared light waves is, as a rule, worse than in the case of a small shear of interfering waves. There is no point in producing greater image separations than are necessary for a given object to be investigated.

Interference microscopes have, however, some defects. These microscopes are, in general, less sensitive than the phase-contrast ones. With the latter one can easily observe optical path differences below 5 A whereas the former are able to visualize optical path differences greater than 10 A.

The present invention provides the best resolution of the problem, providing a microscopical system enabling investigation of different objects by means of both the variable phase-contrast method and interference method with continuously variable image duplication.

SUMMARY OF THE INVENTION

The microscope according to the present invention, mainly intended for the examination of transparent specimens, essentially comprises a light source, a condenser with annular diaphragms and exchageable with them a slit diaphragm located in or near the front focal plane of the condenser; objectives located after the object under examination in the direction of the light beam issuing from the condenser, an eyepiece and an interference system of the Michelson-type located between the objective and the eyepiece and having two interferometer mirrors set at right angle in planes conjugated with the condenser diaphragms, an interference polarizer, which splits the incident light beam into two of orthogonally polarized beams and recombines the parts of these beams reflected by the mirrors, two quarter-wave plates between the interference polarizer and interferometer mirrors, an annular stop located close to or at one interferometer mirror for absorbing light passing directly through the object investigated, an annular diaphragm located close to or at the other interferometer mirror for absorbing light diffracted by the object, two linear polarizers located before and behind the interference polarizer in the direction of the light beams and another quarter-wave plate between one of the linear polarizer and the interference polarizer. This last mentioned quarter-wave plate together with the linear polarizer forms a Sénarmont compensator for varying the phase of the interfering light beams, whereas the second linear polarizer serves to provide amplitude control of these beams. The said annular stop and annular diaphragm associated with the mirrors together with the annular condenser diaphragm are provided for variable phase-contrast observation, whereas shearing interference microscopy is realized by using a slit condenser diaphragm and interferometer mirrors without any stops.

A modification of above summarized microscope comprises, according to the present invention, another interference system in which the geometrical image formed by the objective is projected by a negative lens to infinity, so that the parallel image beams pass through both arms of the interference system, and additionally two identical birefringent plane parallel plates are located in the split light beams between the interference polarizer and the quarter-wavelength plates. One of these birefringent plates is rotatable around the axis along which the light beam passes and the other is tiltable around an axis perpendicular to the axis of the light beam passing through it. Rotation and tilting of these plates provide for changing the shear of the interfering beams and for control of image duplication.

BRIEF DESCRIPTION OF THE DRAWINGS

The invention will now be discussed in connection with the accompanying drawings in which.

DESCRIPTION OF THE PREFERRED EMBODIMENTS

Figure 1:
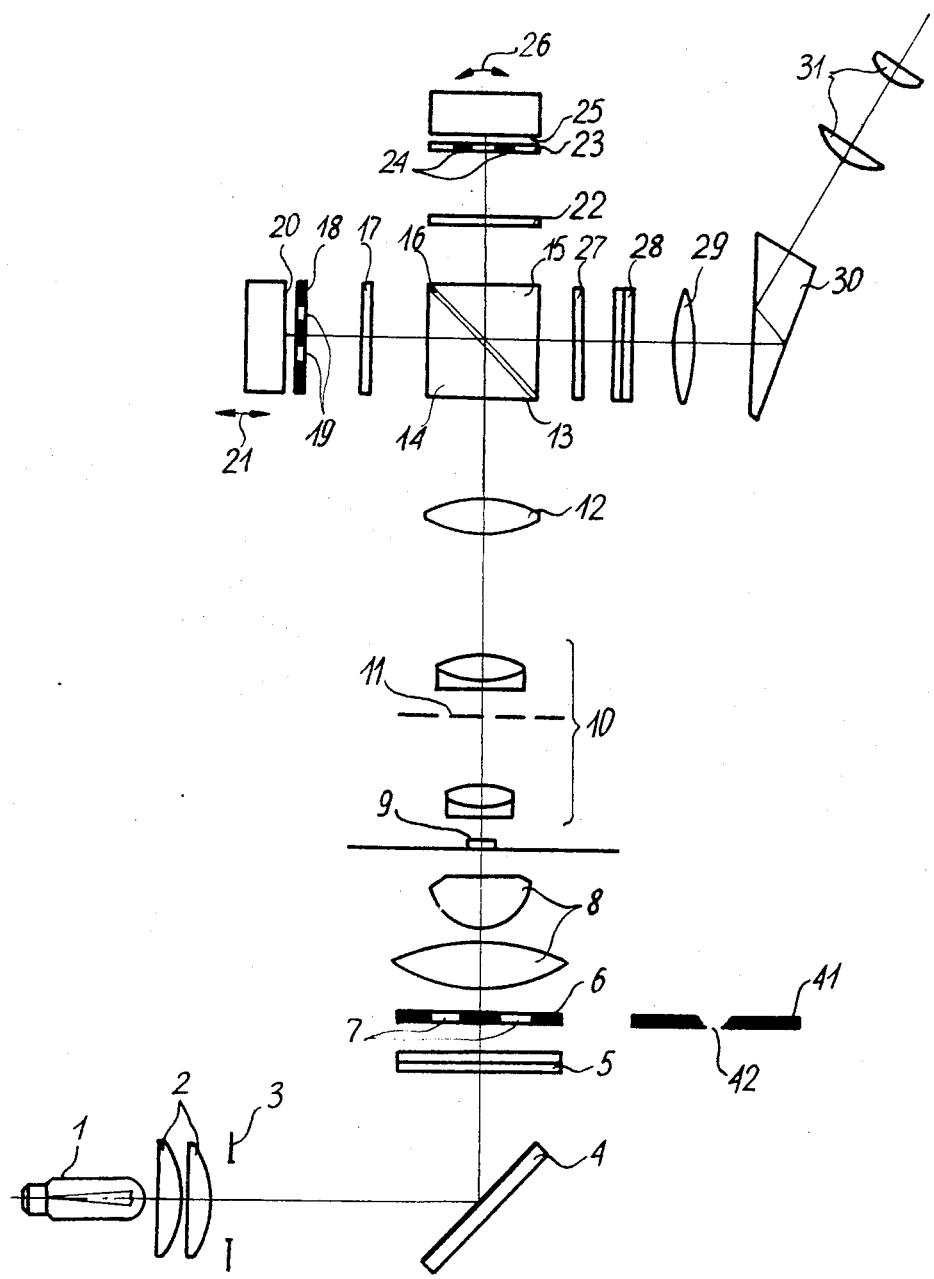
FIG. 1 is a diagrammatic view of the optical system of a microscope in accordance with the invention for observation of transparent specimens with both variable phase-contrast method and shearing interference method with continuously variable image duplication.

The basic components of the optical system diagrammatically illustrated in FIG. 1 are: an interference polarizer 13 used as a beam splitter and recombiner, two quarter-wavelength plates 17 and 22, a diaphragm 18 with transparent annular opening 19 located close to or in the mirror 20, another diaphragm 23 with light absorbing ring 24, two mirrors 20 and 25, a Sénarmont compensator consisting of a quarter-wavelength plate 27 and linear polarizer 28, a condenser diaphragm 6 with transparent ring 7 or exchangeable with it another diaphragm 41 with a transparent slit 42, and a linear polarizer 5. A low-voltage bulb 1 or another light source, collector 2, field diaphragm 3, mirror 4, condenser 8, objective 10, reflecting prism 30 and eyepiece 31 are conventional microscope components. The lenses 12 and 29 perform the function of an auxiliary optical system which permits the connection of the interferometer system with the objective and ocular head of a conventional microscope. The lens 12 forms the image of the condenser opening 7 in the planes of the mirrors 20 and 25. The other auxiliary lens 29 corrects the microscope tube length changed by the lens 12. The interference polarizer 13 consists of two right-angle prisms 14 and 15, the hypotenuse surfaces of which are covered, by vacuum evaporation, by a stack of dielectric thin films 16 alternating of high and low refractive index, and cemented by means of an optical cement. This interference polarizer is made, for instance, by the procedure developed by M. Bannig. The quarter-wavelength plates 17, 22 and 27 are made of a birefringent material in such a manner as to give an optical path difference between the ordinary and extraordinary rays, equal to ¼ wavelength of the light used. The linear polarizers 5 and 28 are made, for instance, of a typical polarizing foil.

Figure 3:
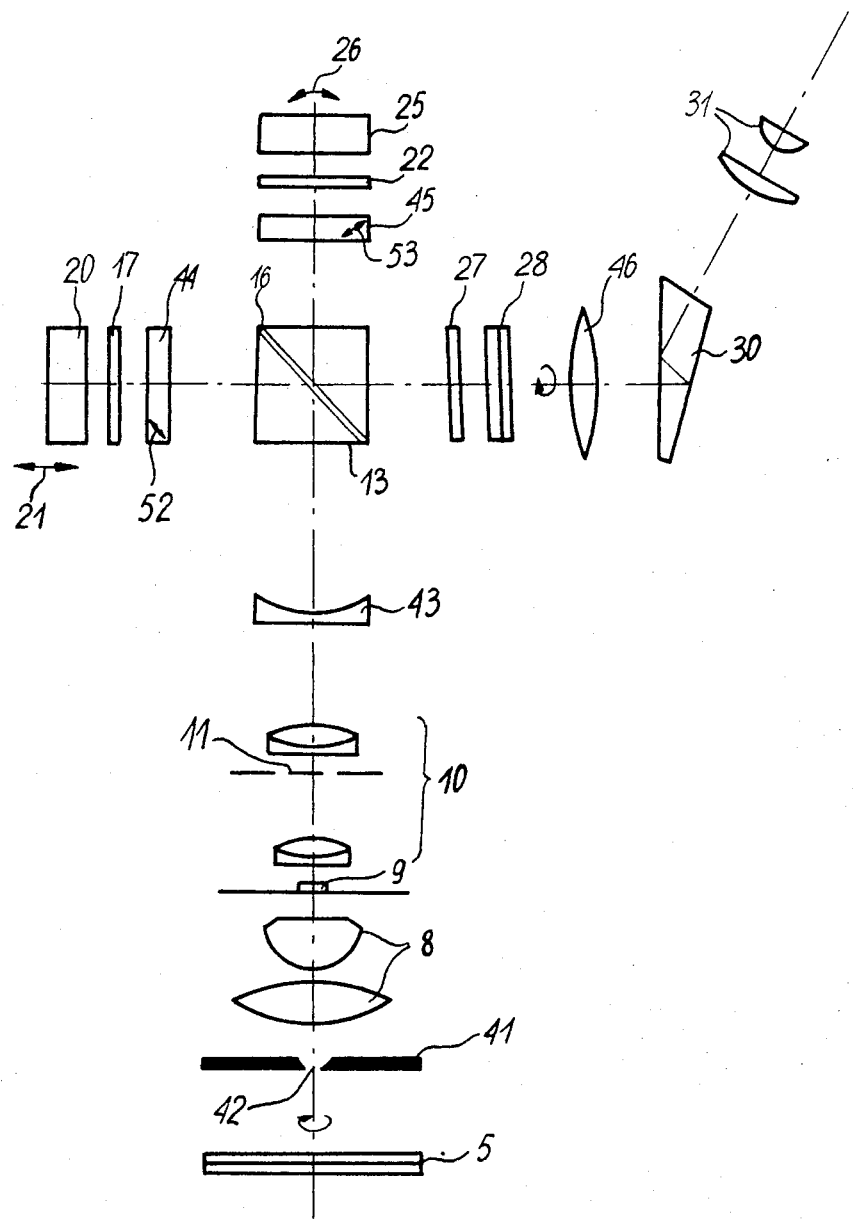
FIG. 3 is a diagrammatic view of a modification of the system in FIG. 1 intended for shearing interference microscopy only.

In the system diagrammatically illustrated in FIG. 3 a negative lens 43 instead of positive one 12 is used. This lens projects to infinity the geometrical image of the object investigated. Thus, parallel image beams run through the arms of the interferometer system. These beams are converged to the front focus of the eyepiece 31 by an auxiliary lens 46 and their interference makes visible the object 9 in a form of two identical images duplicated to a greater or lesser degree. Image duplication is continuously varied by rotation and tilting of the birefringent plates 44 and 45 made of Iceland spar or another birefringent crystal.

The basic unit of the microscope according to this invention is an interference system enabling observation and optical path difference measurements of transparent specimens with both the variable phase-contrast method and the shearing interference method with variable image duplication. The most important element of this system is the interference polarizer 13 used as the beam splitter and recombiner. A light beam incident upon the interference polarizer is split into two parts: a reflected part and a transmitted part, orthogonally polarized by the stack of dielectric thin films 16. The reflected part vibrates perpendicularly to the plane of light incidence and the transmitted part vibrates in this plane. The quarter-wave plates 17 and 22 rotate the planes of light vibrations through 90° by the double passage of the light. For this the vibration axes of these plates are oriented at 45° with respect to the planes of polarization of the light beams leaving the interference polarizer 13. Then one beam, reflected by the mirror 20, passes through the cube 13 and the other beam, being reflected by the mirror 25, reflects totally from the stack of thin films 16 and recombines with the first beam. Both beams, after passing through the polarizer 28, vibrate in the same direction, and thus can interfere with each other.

This interference system is used simultaneously for phase-contrast and shearing interference microscopy. First the variable phase-contrast variant will be discussed. This variant employs a ring diaphragm 6 located in the front focal plane of the condenser 8, and two diaphragms 18 and 23 with annular opening 19 and light absorbing ring 24, located close to or in the mirrors 20 and 25 in such a manner that the light absorbing ring 24 and annular opening 19 are conjugate to the ring-shaped opening 7 of the condenser diaphragm 6. This diaphragm is imaged upon the back focal plane 11 of the objective 10 and next projected by means of an auxiliary lens 12 into secondary planes where the annular opening 19 and annular stop 24 are located. Areas of the mirrors 20 and 25 defined by the annular opening 19 and light absorbing ring 24 are termed the conjugate areas as they are conjugate to the opening 7 in the condenser diaphragm 6. The remaining portion of these mirrors are termed the complementary areas.

Figure 2:
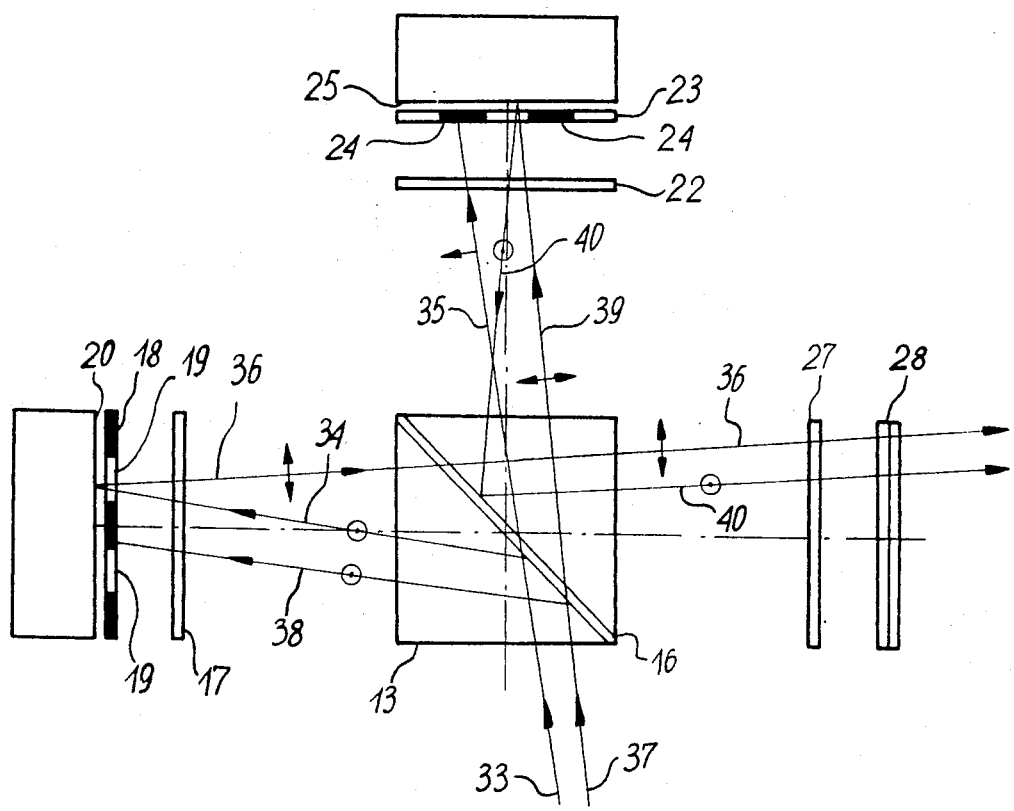
FIG. 2 is a part of the system in FIG. 1 showing more in detail the principle of separation of the direct and diffracted light beams in the case of the variable phase-contrast method.

The direct (undiffracted) light emerging from the condenser diaphragm is totally absorbed by the stop 24,whereas it is transmitted by the opening 19,then reflected by the mirror 20,and passes through the interference polarizer 13 to then reach the eyepiece 31. The light passing through a nonuniform specimen 9 is in part subjected to diffraction and deflection. Practically all of the deviated part of the diffracted light falls on the complementary areas of the mirrors 20 and 25 provided the conjugate areas are sufficiently small. The diffracted light is,in contrast with the direct light,stoped by the diaphragm 18 and reflected by the mirror 25 only. The part reflected by this mirror is rejected by the interference polarizer 13,and on passing through the quarter-wave plate 27 and linear polarizer 28,can interfere with the direct light reflected from the the mirror 20. This is more detailly illustrated in FIG. 2,where there are drawn the paths of two rays: direct 33 and diffracted ray 37,arbitrarily selected from the light beam leaving the specimen under investigation. Each of these rays is split into two parts: thus direct ray 33 has a reflected part 34 and a transmitted part 35, and diffracted ray 37 has a reflected part 38 and a transmitted part 39. The reflected part 38 of the diffracted ray 37 as well as transmitted part 35 of the direct ray 33 are absorbed by the diaphragms 18 and 23,whereas the reflected part 34 of the direct ray 33 and transmitted part 39 of the diffracted ray 37 are reflected by the mirrors 20 and 25,then directed to the eyepiece by the interference polarizer 13.

Rotating the polarizer 28 varies the phase difference $\phi$ between the direct and diffracted light vibrations. This phase difference is $\phi = 2\theta$, where $\theta$ is the angle between the direction of light vibrations in the polarizer 28 and fast axis of the quarter-wave plate 27. Thus a continuous control of the phase difference between the direct and diffracted light beams is achieved. The polarizer 28 acts,in this case, as an analyzer.

The control of the amplitude ratio of the direct and diffracted beams is realized by rotation the quarter-wave plates 22 and 27 or by using an additional linear polarizer 5 located before the interference polarizer 13,e.g. below the condenser 8. Rotating this 5 polarizer alters the amplitude ratio of light vibrations of the direct and diffracted beams 36 and 40 (FIG. 2), while their phase difference remains constant. If $\gamma$ denotes the angle between the direction of light vibration in the polarizer 5 and principal section of the interference polarizing spltter 13 (this section is the plane of the paper in FIG. 1 and 2), then for $\gamma = 0$ only the diffracted light reaches the eyepiece 31, and for $\gamma = 45°$ only the direct light passes to the eyepiece 31. For intermediate setting of the polarizer 5 the intensity ratio of the direct and diffracted beams changes as $\tan^2 \gamma$. The result is a phase-contrast system wherein both the phase difference and intensity ratio of the direct and diffracted light waves.

The Sénarmont compensator consisting of the quarter-wave plate 27 and analyzer 28 can be, of course,placed in the light beam incident at the interference polarizer 13,and vice versa — the polarizer 5 can be located in the beams 36 and 40 leaving the splitter 13. In other words,the Sénarmont compensator 27–28 and polarizer 5 are interchangeable.

The above described system is operated as follows. It is first aligned for Köhler illumination and the object 9 under investigation is brought into focus. Then the mirrors 20 and 26 are so adjusted that zero order uniform field interference without any lateral light beam shearing in the exit pupil of the objective 10 is observed. For this the diaphragms 18 and 23 are decentered or set aside,and the eyepiece 31 is replaced by an auxiliary lunette focused at the image of the condenser diaphragm 6. In doing the zero order uniform field interference, the diaphragms 18 and 23 are returned,and the annular opening 7 of the condenser diaphragm 6 is exactly centered with conjugate areas of the mirrors 20 and 25 (these areas are defined by the annular opening 19 and ring stop 24 being centered with each other). Contrast in the image of the object 9 is then varied by rotating the analyzer 28 and polarizer 5. To reverse the sign of the image contrast the analyzer 28 is rotated in contrary directions starting from its zero setting.

The phase-contrast system showed in FIG. 1 can easily be transformed into a polarization interference microscope with variable image shearing. For this a slit condenser diaphragm 41 is used instead of the annular diaphragm 6,and the mirror diaphragms 18 and 23 are removed. The system modified in such a manner acts as follows. The mirror 25 has,by reflection on the stack of thin films 16 of the interference polarizer 13,an image located in (or near) the reflection surface of the mirror 20. If this image is not exactly parallel to the mirror 20,straight interference fringes are observed in the exit pupil of the objective 10. If,simultaneously,the image of the condenser slit 42 is brought in a parallel coincidence with the plane of localization of the interference fringes, and the width of the slit image is smaller than one fourth of a fringe interspace,then uniform field interference is produced in the image plane of the microscope. In other words, the interference fringes are infinitely enlarged in the image plane of the microscope. Thus,the object 9 is seen in a form of two identical images laterally duplicated in a greater or lesser degree and colored according to the Newtonian scale of colors if white light is used. The colors in the separated areas of the images are symmetrical relative to the uniform interference color of the background. If monochromatic light is used,the background appears at a uniform intensity and the separated areas of images show up as differences in relative brightness. The image duplication and direction of shearing can be controlled by tilting one of the interferometer mirrors,e.g. 20. The larger image duplication the smaller the spacing between the interference friges arising in the exit pupil of the objective. Consequently,a smaller width of the condenser slit 42 is needed.

The optical path difference between the object 9 and its surrounding medium is measured by the minimum intensity or minimum visibility methods. For this,it is more advantageous to proceed as follows. Using monochromatic light,the analyzer 28 is set so that one of the separated images appears maximally dark,and then the analyzer is rotated through an angle $\alpha$ until the second image appears maximally dark. The optical path difference $OPD = (\alpha/360)\lambda$. The other way is to start with the analyzer setting at which the one image shows up with exactly the same brightness as the background immediately adjacent to the object,and then rotate the analyzer through an angle $\beta$ until the second image shows up the same brightness as the background. In this case $OPD = (\beta/180)\lambda$.

With these methods values of OPD equal to fractions of the light wavelength $\lambda$ can be determined. Optical path differences equal to multiples of $\lambda$ are read out after examination of interference colors or the interference fringes displacement.

Fringe field interference is achieved when the image of the condenser slit 42 is not in coincidence with the interference fringes appearing in the exit pupil of the objective 10. This kind of interference is then obtained by tilting one of the mirrors 20 and 25 or by shifting the slit diaphragm 41 in the direction of the optical axis of the condenser 8.

Another system for shearing interference microscopy is presented in FIG. 3. In this system image shearing is varied with birefringent plane parallel plates 44 and 45 located in the split light beams between the interference polarizer 13 and quarter-wave plates 17 and 22,and the negative lens 43,rejecting the geometric image of the object 9 to infinity, is applied.

The general working principle of this microscope system is as follows. A plane light wave leaves the condenser 8 and passing through the object 9 it is subjected to a phase shift corresponding to the optical path difference between the object and its surrounding medium. The geometrical image of the object 9, formed by the objective 10 in its image plane, is rejected to infinity by the negative lens 43, the back focal point of which coincides with the image plane of the objective 10. Thus, a parallel image beam falls on the interference polarizer 13, half being reflected and half transmitted. Both halves are polarized by the stack of thin films 16. The reflected part vibrates, as in FIG. 1, perpendicularly to the plane of incidence of the light and the transmitted part vibrates in this plane. The quarter-wave plates 17 and 22 rotate the planes of light vibrations through 90° by the double passage of the light, so that one beam being reflected by the mirror 20 passes through the interference polarizer 13 and the other beam being reflected by the mirror 25 reflects is totally reflected from the stack of thin films 16 and recombines with the first beam. Both beams, after passing through the quarter-wave plate 27 and analyzer 28, vibrate in a same direction, thus can interfere with each other. They are converged to the front focus of the eyepiece 31 by the lens 46 and their interference makes visible the transparent object 9 in a form of two identical images laterally duplicated to a greater or lesser degree as in the case of the system illustrated in FIG. 1. The quarter-wave plate 27 is set, as previously, in such a manner that its light vibration axes form an angle of 45° with respect to the vibrations of the recombined beams. However, image shear or splitting is now controlled by birefringent plane parallel plates 44 and 45. These plates are cut at an angle of 45° (or at another angle) to the optical axis of a double-refracting crystal.

Figure 4:
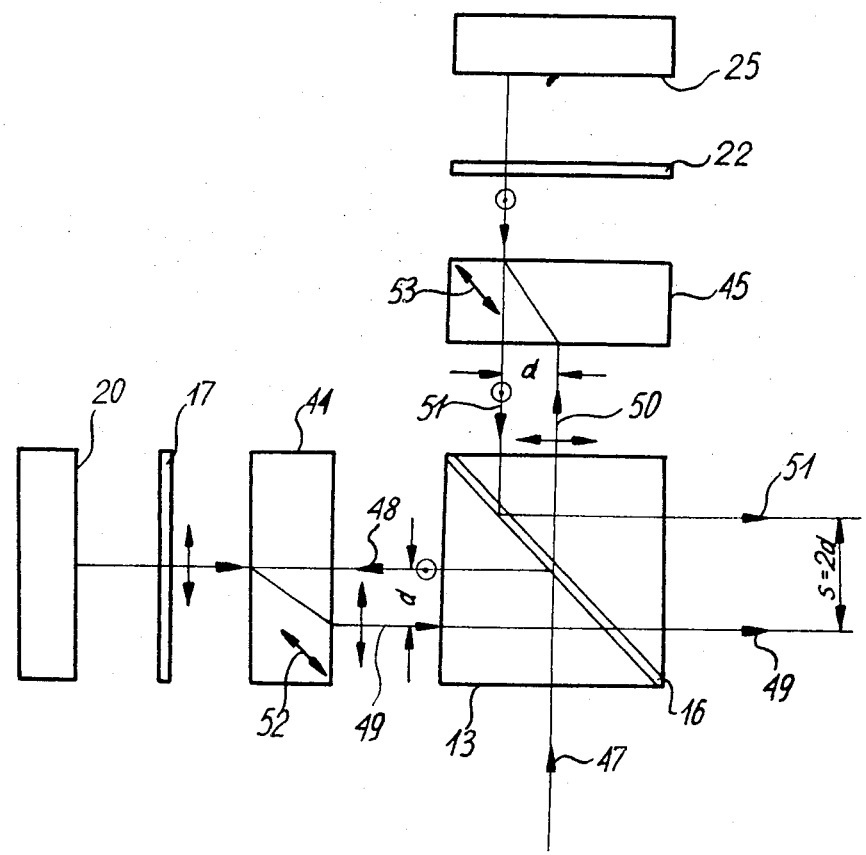
FIG. 4 is a part of the system in FIG. 3 showing more in detail ray paths between the interference polarizer and interferometer mirrors.

The principle of image doubling is more in detail illustrated in FIG. 4. Let 47 be a ray arbitrarily selected from the image light beam. The reflected part 48 of this ray passes through the birefringent plate 44 as an ordinary ray without deflection. The quarter-wave plate 17 is set so that its principal axes of light vibrations form an angle of 45° with respect to the polarization plane of the ray 48. As the light traverses the plate 17 twice, it acts as a half-wave plate and rotates the plane of polarization of ray 48 through 90°. Thus, the ray 48 becomes the extraordinary ray on its return. It is subjected to deflection and leaves the plate 44 as a ray 49 displaced parallel to its previous path by a distance $$d = \frac{n_e^2 - n_o^2}{n_o^2 + n_o^2} t$$

where $t$ is the thickness of the plate 44, and $n_e$ and $n_o$ are the extraordinary and ordinary refractive indices of the double-refracting crystal from which the plate is cut. If, for instance, the plate 44 is made of Iceland spar and its thickness $t$ is equal to 10 mm, the displacement $d = 1.1$ mm.

The second birefringent plate 45 is, in the case of FIG. 4, set so that the transmitted ray 50 behaves contrary to the ray 48. On its way to the mirror 25 it passes through the plate 45 as the extraordinary ray, thus being deflected, and as the ordinary ray 51 on returning. The ray 51 is therefore displaced by a distance $d$ in the opposite direction to ray 49. Then the resultant separation $s$ of the rays 49 and 51 leaving the interference polarizer 13 is equal to $2d$. This separation defines the maximum value of image duplication for the uniform field interference. It can be reduced in two ways. The first depends on tilting one (or both) of the birefringent plates 44 and 45 about the axis perpendicular to the plane the paper of FIG. 4 or 3. This give, however, only a small change in the separation of the rays 49 and 51. The second, and more effective, way depends on rotation of the birefringent plate 44 (or 45) about the axis of ray 48 through angles of 90° and 180° starting from the setting shown in FIG. 4. Let, for instance, the plate 45 be rotated about the ray 50 through 180°. Then the ray 51 turns through 180° as well, and falls on the beam splitting stack of thin films 16 at the same point as the ray 49. Thus both rays leave the interference polarizer 13 without any separation. Now, let the plate 45 be rotated through 90° starting from the position as shown in FIG. 4. Then the ray 50 enters the plate 45 as the ordinary ray and leaves it, after reflection from the mirror 25, as the extraordinary ray translated by a distance $d$ with respect to the previous ordinary trace. But in this case the plane of ray translation is oriented perpendicularly to the plane of FIG. 4, and, of course, to the principal section of plate 44. The resultant separation $s$ of rays 49 and 51 is now equal to $d\sqrt{2}$. Thus, rotating the birefringent plate 45 about the ray 50 (or plate 44 about the ray 48) three different beam separations $s = 0$, $2d$ and $d\sqrt{2}$ can be obtained depending on the orientation of the optical axes 52 and 53 of the birefringent plates 44 and 45.

Duplication of the image of the object under examination can be further modified in any of these cases by tilting the birefringent plates about the axes perpendicular to their principal sections. Thus in a range of image splitting $s = 0$ to $2d$ are obtained all the image duplications almost continuously. Simultaneously the direction of image duplication can be suitablely oriented. Tilting one of the mirrors, e.g. 25, in any direction 20, and simultaneously shifting the other mirror, e.g. 20, in the axial direction 21, one passes from uniform field interference to fringe field interference and vice versa. The optical path difference between the object and its surrounding medium is mesured as previously described for the system of FIG. 1.

The essential advantages of the interference system shown in FIG. 3 is, in contrast to the system illustrated in FIG. 1, are its more simple construction and operation. For objectives of various magnifications the back focal plane 11, in which the condenser diaphragm 6 is imaged, lies at different depths. In order to bring the image of the transparent ring 7 into coincidence with the conjugate areas of the mirrors 20 and 25 of the system shown in FIG. 1, the auxiliary lens 12 must be translated in the direction parallel to the objective axis or replaced by another with different focal length, when one objective is exchanged for another. Consequently, for maintaining a constant tube length, the other auxiliary lens 29 must be suitably translated or replaced by another. Variable-focus systems can also be used instead of different lenses 12 and 29. In the case of the interference system illustrated in FIG. 3 one auxiliary lens 43 and one lens 46 are needed for objectives of all magnifications. This system cannot, however, be used for phase-contrast observation.

Exemple represented in FIG. 3 is particularly suitable for interference research in a wide field of biology and medical science, especially for dry mass content determination in biological cells and tissues as well as in fragments thereof. It is also suitable for measurement of refractive index and/or thickness of thin transparent objects. It permits also determination of birefringence and refractive indices of birefringent fibers and microcrystals. The embodiment represented in FIG. 1 is, in particular, very useful for both phase-contrast observation with variable image contrast and for interferometric examination of transparent specimens. Its most valuable feature is the ability to pass rapidly from the variable phase-contrast method to uniform and fringe field interference with variable image duplication.

It is understood that the annular condenser diaphragm 6 in the system described for variable phase-contrast observation can be replaced by a diaphragm with a transparent opening of another shape, e.g. a disk. Consequently, diaphragms with opaque and transparent disks should be placed close to the interferometer mirrors 20 and 25. The condenser diaphragm with an annular opening is, however, more preferred.

It is also understood that the slit condenser diaphragm 41 in the shearing interferences systems described can be replaced by a diaphragm with a transparent opening of another shape giving a coherent illumination, e.g. a pinhole. The slit diaphragm gives, however, more light. The shearing interference systems described are particularly suitable for use with the light from a laser with Brewster windows. The laser gives a light beam linearly polarized and with ideal spatial and temporal coherence.

It is worth mentioning that the objective 10 and auxiliary lens 12 in the system illustrated in FIG. 1 can be replaced by an objective whereby the aperture diaphragm 6 or 41 may be imaged directly on the mirrors 20 and 25. This is, for instance, the case of low power objectives having a long back focal length.

Analogically, the objective 10 and auxiliary negative lens 43 in the system illustrated in FIG. 3 can be replaced by a so called infinity corrected objective.

The systems described may also be modified into incident light phase-contrast and shearing interference microscopes for examination light reflecting surfaces of non-transparent specimens. For this an incident light or vertical illuminator comprising semi-transparent means and suitable annular or slit aperture diaphragms are used.

What I claim is:

1. In combination with a compound microscope comprising a condenser, an objective and an eyepiece, a system for both the variable phase-contrast and variable shearing interference microscopy comprising, in optical alignment, a light source, an aperture diaphragm in the front focal plane of the condenser, and an interference system disposed between the objective and eyepiece and comprising: first and second interferometer mirrors, set at right angle in planes conjugate with said condenser aperture diaphragm; an interference polarizing beam splitter for splitting the incident light beam into two orthogonally polarized beams; first and second quarter-wavelength plates in said split light beams between the interference polarizing beam splitter and the interferometer mirrors; first and second interferometer mirror diaphragms, the first being close or at the first interferometer mirror and movable beyond the limits of this mirror, the second being close or at the second interferometer mirror and movable beyond the limits of this mirror; first and second rotatable linear polarizers, the first being before said interference polarizing beam splitter in the incident light beam, and the second after said interference polarizing beam splitter in the light beams reflected by the interferometer mirrors and recombined by the interference polarizing beam splitter; a third quarter-wavelength plate between said second linear polarizer and the interference polarizing beam splitter; first auxiliary lens means located after said microscope objective for giving a real image of said conderser diaphragm in the planes of said interferometer mirrors or in infinity second auxiliary lens means in the recombined light beams after said polarizing beam splitting means for projecting an interference or phase-contrast image of an object to the focal plane of said eyepiece.

2. A microscope as claimed in claim 1, wherein one of the interferometer mirrors is supported in an axially shifting mount and the other interferometer mirror is supported in a tilting mount.

3. A microscope as set forth in claim 1, wherein said aperture condenser diaphragm includes a transparent annular opening; the diaphragm of the first interferometer mirror having an opaque ring which absorbs the direct light issuing from the condenser annular opening and which first interference mirror diaphragm transmits the light diffracted by an object under investigation; the diaphragm of the second interferometer mirror having a transparent ring which transmits the direct light issuing from the condenser annular opening and which second interferometer mirror diaphragm absorbs the light diffracted by the object under investigation, both the opaque ring of the first interferometer mirror diaphragm and the transparent ring of the second interferometer mirror diaphragm being optically conjugate by said first auxiliary lens means with the annular condenser opening.

4. A microscope as claimed in claim 3, wherein one of the interferometer mirrors is supported in an axially shifting mount and the other interferometer mirror is supported in a tilting mount.

5. A microscope as set forth in claim 1, wherein said aperture condenser diaphragm includes a transparent slit, the real image of which is focused in or near the interferometer mirrors and said first and second interferometer mirror diaphragms are beyond the limits of said mirrors.

6. A microscope as set forth in claim 5, wherein one of the interferometer mirrors is supported in an axially shifting mount and the other interferometer mirror is supported in a tilting mount.

7. A microscope as set forth in claim 5, wherein said interference system additionally comprises two identical, first and second, plane-parallel birefringent plates, the first berefringent plate being between said interference polarizing beam splitter and said first quarter-wavelength plate and being rotatable on the axis of the light beam, and the second birefringent plate being between said interference polarizing beam splitter and said second quarter-wavelength plate and tiltable around the axis perpendicular to the axis of the light beam passing therethrough.

8. A microscope as claimed in claim 7, wherein one of the interferometer mirror is supported in an axially shifting mount and the other interferometer mirror is supported in a tilting mount.

9. A microscope as set forth in claim 1, wherein said interference system additionally comprises two identical, first and second, plane parallel birefringent plates, the first birefringent plate being between said interference polarizing beam splitter and said first quarter-wavelength plate and being rotatable on the axis of the light beam, and the second birefringent plate being between said interference polarizing beam splitter and said second quarter-wavelength plate and tiltable around the axis perpendicular to the axis of the light beam passing therethrough.

10. A microscope as claimed in claim 9, wherein one of the interferometer mirrors is supported in an axially shifting mount and the other interferometer mirror is supported in a tilting mount.

11. In combination with a compound microscope comprising an objective and an eyepiece, a system for the examination of light reflecting surfaces of a non-transparent specimen comprising, in optical alignment, light source means including transparent reflecting means, an aperture diaphragm, and an interference system disposed between the objective and eyepiece and comprising: first and second interferometer mirrors, set at right angle in planes conjugate with said aperture diaphragm; an interference polarizing beam splitter for splitting the incident light beam into two orthogonally polarized beams; first and second quarter-wavelength plates in said split light beams between the interference polarizing beam splitter and the interferometer mirrors; first and second interferometer mirror diaphragms, the first being close or at the first interferometer mirror and movable beyond the limits of this mirror, the second being close or at the second interferometer mirror and movable beyond the limits of this mirror; first and second rotatable linear polarizers, the first being before said interference polarizing beam splitter in the incident light beam, and the second after said interference polarizing beam splitter in the light beams reflected by the interferometer mirrors and recombined by the interference polarizing beam splitter; a third quarter-wavelength plate between said second linear polarizer and the interference polarizing beam splitter; first auxiliary lens means located after said microscope objective for giving a real image of said condenser diaphragm in the planes of said interferometer mirrors or in infinity, second auxiliary lens means in the recombined light beams after said polarizing beam splitter means for projecting an interference or phase-contrast image of an object to the focal plane of said eyepiece.

* * * * *